United States Patent [19]
Comstedt

[11] 3,858,699
[45] Jan. 7, 1975

[54] SINGLE LEVER CONTROL FOR THROTTLE AND GEARING

[75] Inventor: Tore Erik Karl Comstedt, Stockholm, Sweden

[73] Assignee: AB Tekniska Fjadrar, Frolunda, Sweden

[22] Filed: June 4, 1973

[21] Appl. No.: 367,001

[30] Foreign Application Priority Data
June 16, 1972 Sweden............................. 7983/72

[52] U.S. Cl...................... 192/.098, 74/875, 74/108
[51] Int. Cl.......................................... B60k 21/00
[58] Field of Search ............ 192/.096, .098; 74/875, 74/108

[56] References Cited
UNITED STATES PATENTS
| | | | |
|---|---|---|---|
| 2,966,969 | 1/1961 | Morse............................... | 192/.098 |
| 3,204,732 | 9/1965 | Morse............................... | 192/.096 |

Primary Examiner—Benjamin W. Wyche
Attorney, Agent, or Firm—Young & Thompson

[57] ABSTRACT

A single lever control for operating both throttle and gearing in a boat motor, comprising a first operating arm for the shifting operation and a second operating arm for the throttle operation, said first and second operating arms being affected by the turning of an axle upon which the operating lever acts, said axle being coupled to a cam member and a cam follower, one of which in turn being connected to a displaceably mounted attachment member for the outer casing of a control wire connected to the second control arm, the cam member having a cam curve with such a shape that intitial turning of the axle from a neutral position produces a displacement of the attachment member of the casing in the same direction as the control wire is displaced by the second operating arm, thereby preventing or retarding throttle movement before the gear is engaged.

5 Claims, 3 Drawing Figures

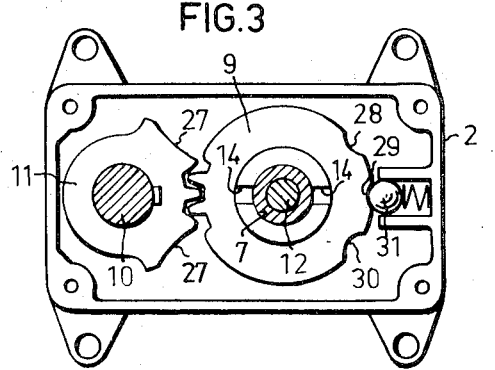
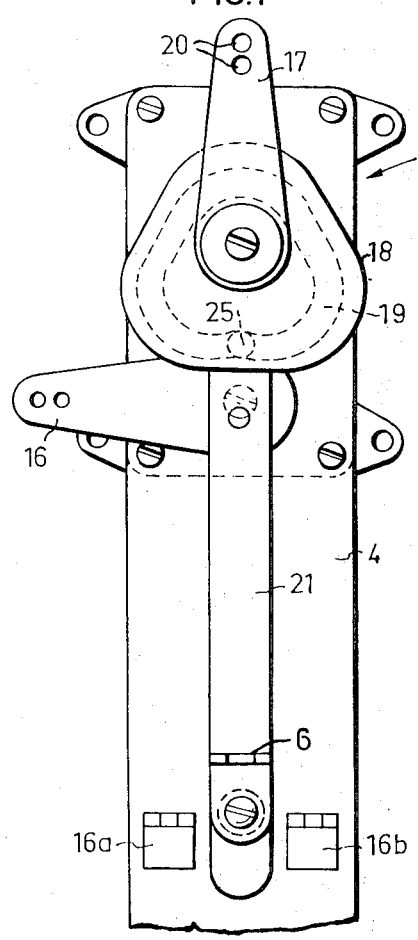
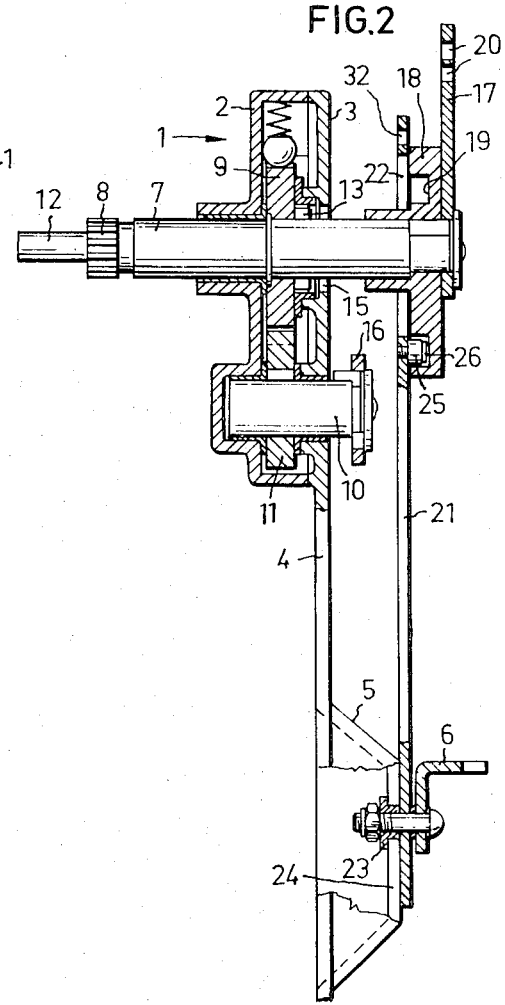

SINGLE LEVER CONTROL FOR THROTTLE AND GEARING

The present invention relates to a control for performing two different control operations by means of a single control lever, preferably for control of the throttle and gearing in a boat motor, comprising a main axle rotatably journalled in a housing, upon which axle the control lever acts, a first control arm affected by the rotation of the main axle by means of movement transferring means, as well as a second control arm connected to the main axle and designed to be connected to a control wire with an outer casing which has a displaceably mounted attachment member whose displacement is achieved through means connected to the main axle.

Controls of this type are used to prevent or retard throttle movement before the gear is engaged. In a known construction of the above-mentioned type (U.S. Pat. No. 2,966,969) the shifting is performed by the first control arm and the throttling with the second. The main axle carries the driving gear wheel in a Geneva gear, the driven gear wheel of which, when rotated, acts on the first control arm. The driven gear wheel carries an arm which regulates via a link the displacement of the casing in such a manner that when the gear is engaged the casing is displaced just as much and in the same direction as the control wire is displaced by the second control arm, thereby retarding the throttle movement. As soon as the gear is engaged, the driven gear wheel is locked by the driving gear wheel. Continued turning of the main axle by means of the operating lever thus causes a relative displacement between the control wire and its casing, thereby causing throttle movement. A disadvantage of this construction, however, is that the sudden locking of the driven gear wheel and with it the means controlling the displacement of the casing causes a rapid throttle movement.

The purpose of the present invention is to achieve a control of the type disclosed in the introduction, which avoids the above-mentioned disadvantages and makes possible a slow stepless braking of the movement of the casing after the engagement of the gear so that a gentle throttle movement is obtained. A further purpose is to achieve a control which can be easily rearranged for a push or pull throttle without the necessity of exchanging structural members and while retaining the slow stepless braking of the casing.

This is achieved according to the invention by the means coupled to the main axle comprising a cam follower and a cam member with a cam curve, the cam curve having such a shape and being so arranged that the initial turning of the main axle from a neutral position achieves a displacement of the attachment member of the casing in the same direction as the control wire is displaced by the second control arm. This achieves a delay of the operating function of the second control arm in relation to that of the first arm. This makes possible the simple adjustment to the desired gentleness of the throttle movement after engagement of the gear by merely choosing an appropriate cam curve. Also the control can be easily changed from a push to a pull throttle or vice versa by merely turning the cam member and the second operating arm 180° relative to the main axle and by moving the cam follower correspondingly.

The control according to the invention is described in more detail with reference to the example shown in the accompanying drawing, in which FIG. 1 is a front view of a control according to the invention, FIG. 2 is a cross section through the control in FIG. 1, and FIG. 3 shows the control housing with one wall taken away to reveal the Geneva gear.

The control has a housing 1 which consists of two interconnected members 2 and 3, the latter of which has an extension 4 which forms a console 5 for a displaceable bracket 6 for a control wire casing, as will be described below. A main axle 7 is rotatably journalled in the housing 1, and one end of said axle 7 is formed with splines 8 for fastening of an operating lever (not shown). A Geneva wheel 9 is rotatably journalled on the axle 7, and this wheel engages a Geneva wheel 11 fixed on an axle 10 which is rotatably journalled in the housing. The axle 7 has a central hole through which a pin 12 extends. This is pressed to the left by a spring (not shown) disposed in the central hole, and a locking pin 13 situated in a radial bore in the pin 12 and which extends through axial slots in the axle 7 engages the cavities 14 (FIG. 3) in the wheel 9 and locks the same for turning together with the axle 7. The wheel 9 can be disengaged by pressing in the pin 12 against the spring (not shown), the locking pin 13 then being taken out of engagement with the cavities 14 and into an opening 15 in the housing 3.

A first operating arm 16 designed to be connected to the gearing mechanism in a boat motor is securely fixed to the axle 10. Brackets 16a, b securely disposed on the housing 4 form points of attachment for the outer casing of the control wire of the gear mechanism. Either bracket 16a or 16b can be used depending on the type of arrangement. A second operating arm 17 designed to be connected to the control wire for the throttle is securely connected to the main axle 7. A cam member 18 in the shape of a disc is disposed axially inside of the arm 17, which is likewise securely connected to the main axle 7. The cam member 18 has a cam groove 19 which has in the embodiment shown essentially the shape of a heart and is symmetric relative to a line through the attachment hole 20 for the control wire in the arm 17 and the centre axis of the axle 7. A link 21 is disposed axially inside the cam member 18 and has at one end an oblong opening 22 through which the axle 7 extends so that the link 21 is displaceable a limited distance in its axial direction. At its opposite end the link 21 carries the bracket 6 for the control wire casing and a sliding block 23 which slides in an oblong opening 24 in the bracket portion 5 of the extension 4 of the housing. Furthermore the link 21 carries a cam follower 25 which engages in the cam groove 19. The cam follower 25 consists of a roller of for example delrin which is attached to the link by means of a screw 26.

The operating arms at 16 and 17 and the displaceable bracket 6 are connected to control wires, their casings and various links and levers in a manner well known in this art, for example as shown in U.S. Pat. No. 2,966,969 to which reference is had for a more detailed enclosure of these conventional aspects of the invention.

In the position shown the operating arms 16 and 17 are in the neutral position, i.e., no gear is engaged and the throttle is in idle position. When the operating lever is moved causing rotation of the axle 7, the driving Geneva wheel 9 is turned thereby turning the axle 10 of the driven Geneva wheel 11 with the operating arm 16. The wheel 11 is turned until one of its contact surfaces 27 comes into contact with the periphery of the driving wheel 9 at which time the wheel 11 is locked. The forward or reverse gear is now engaged, depending on in which direction the operating lever is moved. To mark the gear positions and the neutral position, three concave recesses 28,29,30 are made in the wheel 9. A roller 31 is disposed in the housing, which is pressed by a spring against the wheel 9 and snaps into the respective recess of which recess 29 is the neutral position.

During the sequence described above the operating arm 17 for moving the throttle is turned at the same time. This also turns the cam 18 so that the cam follower 25 is moved in the cam groove 19. Due to the shape of the cam groove 19 shown in the example, the cam follower 25 and with it the link will be displaced downward, as seen in FIGS. 1 and 2. Thus the attaching point 6 for the wire casing is displaced downward, the cam groove 19 having such a shape that no relative displacement occurrs between the control wire and the casing while a gear is being engaged and that after engagement of a gear an appropriate braking of the movement of the attachment point 6 is achieved so that the throttle movement is gentle. Due to the fact that the cam groove is symmetrical relative to the neutral position, the same function is obtained regardless of whether the forward or reverse gear is engaged. The shape of the cam groove 19 can of course vary within broad limits to achieve the desired throttle movement in each arrangement. Depending on the arrangement the cam follower can also be placed on the opposite side of the axle 7 and the screw 26 be attached in the hole 32, and the cam 18 turned 180°.

In warming up the motor when a limited throttle movement is desired with the gear in the neutral position, the pin 12 is pressed in, disengaging the Geneva wheel 9 so that only the operating arm 17 for the gas supply is affected when the axle 7 is turned. When the axle 7 is returned to the neutral position, the pin is returned to the position for locking of the wheel 9 on the axle by means of the spring (not shown).

Even if the invention in the preceding has been described by referring to an example in which the cam is securely connected to the main axle and the cam follower to the bracket for the casing, it is obvious that the same function and advantages are achieved if the placement of these parts is reversed, i.e., with the cam connected to the bracket of the casing and the cam follower to the main axle.

What I claim is:

1. Control for carrying out two different control operations by means of one operating lever, preferably for control of the throttle and gearing in boat motors, comprising a main axle rotatably journalled in a housing, upon which axle the operating lever acts, a first operating arm for the shifting operation, said arm being affected by the turning of the main axle by means of movement-transferring means, and a second operating arm for throttle operation, said second arm being secured to the main axle and designed to be connected to a control wire with an outer casing which has a displaceably mounted attachment whose displacement is achieved by means which are coupled with the main axle, characterized in that the means which are coupled to the main axle comprise a cam follower and a cam member with a cam curve, the cam curve having such a shape and being so disposed that the initial turning of the main axle from a neutral position produces a displacement of the attachment member of the casing in the same direction as the control wire is displaced by the second operating arm, thereby achieving a delay of the operating function of the second operating arm in relation to that of the first arm.

2. Control according to claim 1, characterized in that the attachment member of the outer casing is connected to the cam follower and that the cam member is secured to the main axle.

3. Control according to claim 1, characterized in that the attachment member for the outer casing is connected to the cam member and that the cam follower is secured to the main axle.

4. Control according to claim 1, characterized in that the attachment member of the casing is disposed at one end of a link journalled so as to be displaceable in the displacement direction of the control wire, which link has at its opposite end an oblong opening through which the main axle extends, the cam follower being formed of a member connected to the link.

5. Control according to claim 1, characterized in that the cam member is formed of a disc and that the cam curve is an essentially heart-shaped groove which is symmetrical relative to a line through the axis of rotation of the second operating arm and its point of attachment for the control wire.

* * * * *